June 7, 1932. F. W. PERRY 1,862,349
POULTRY FEEDER
Filed Dec. 6, 1928
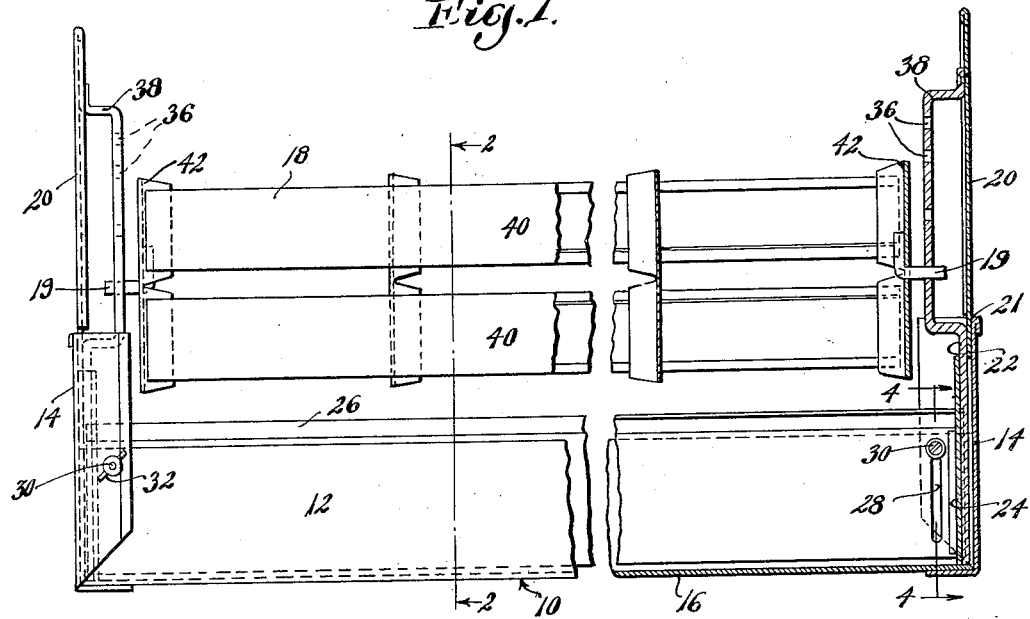
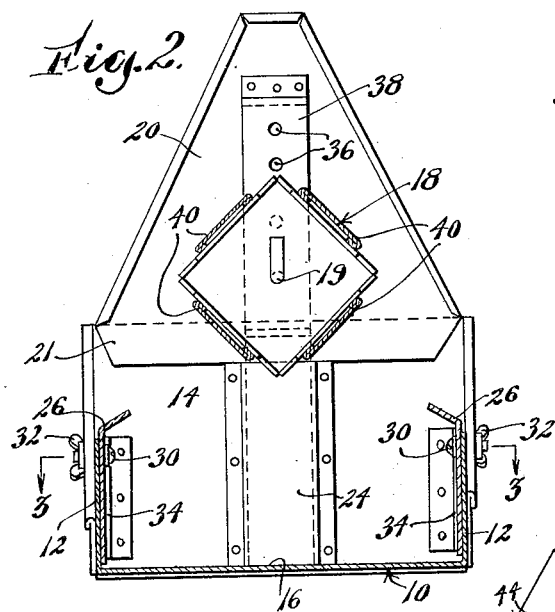
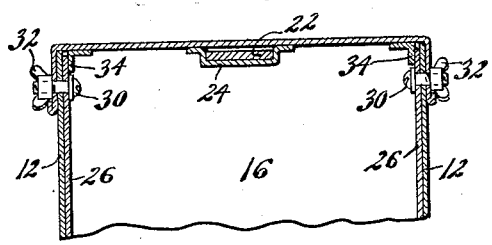
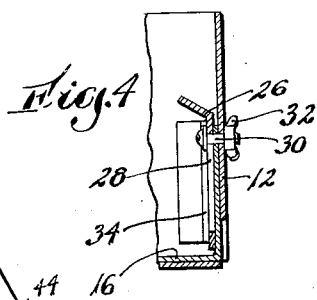
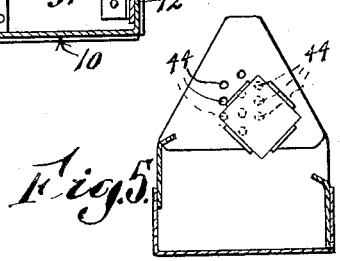
Inventor
Franklin W. Perry.
by Mitchell, Chadwick & Kent
attorneys Patented June 7, 1932

1,862,349

UNITED STATES PATENT OFFICE

FRANKLIN W. PERRY, OF LYNNFIELD CENTER, MASSACHUSETTS

POULTRY FEEDER

Application filed December 6, 1928. Serial No. 324,086.

This invention relates to improvements in poultry feeders. More especially it relates to feed troughs, or hoppers, wherein feed may be held within reach of the poultry without becoming befouled as a result of their getting into the trough, or roosting above it.

Heretofore it has been usual to make feeders of this general description with side walls of such height that a chicken, for example, could reach over to pick up feed from the trough. Also, a rigid barrier has been provided above the trough for obstructing the middle of the top space or mouth in a manner to prevent bodily entry, but leaving ample space at the sides of the top through which the head and neck might be inserted and the feed be reached. With feeders as heretofore made, with walls of fixed height, the growth of the birds has made it necessary to have a series of different sizes of troughs, in order satisfactorily to accommodate a brood through the various stages of growth from chicks to mature birds, the units of the series having successively higher walls, and being selected for use, according to the size of the poultry. This requires the breeder to purchase a set of several feeders, which can be used only one at a time by his brood.

It is an object of the invention to provide so that poultry feeders may be made uniform for all stages of growth of the brood; so that a single feeder satisfactorily and efficiently can serve for chicks, chickens and for full grown hens, in turn. A feature is that the trough walls quickly and easily may be adjusted to desired height. Indeed, being independently adjustable, one side may be set as for chicks and the other as for a hen. Another feature resides in having the obstructing means at the mouth of the trough adapted to be elevated or lowered accordingly as the side walls are raised or lowered, and to be freely rotatable in all of its positions. It is moreover an important feature that the device is constructed simply; and that it may be manufactured at small cost, on principles of mass production.

These objects and advantages may be obtained with a sheet metal trough, of galvanized iron, for example, which has fixed side walls that are low enough for a chick to reach over; and has vertically adjustable extensions for said walls, which may be raised to make the side walls as much higher as will be required up to the height for a full grown hen. Combined with the extensible side walls are fixed end walls which have pockets for receiving movable extensions, and the extensions have end bearings for a rotatable rectangular obstruction, centered over the open top of the trough, of the sort already known. This affords means for the adjusting of the drum as to height, according as the height of the trough side walls are adjusted. The rotatability of the drum prevents the roosting thereon of poultry. By the present invention the feeder can be arranged to accommodate each successive stage of growth from chick to hen, and in all of its positions of adjustments the feed will be equally well protected against becoming befouled.

It is intended that the patent shall cover, by suitable expression in the appended claim, whatever features of patentable novelty exist in the invention disclosed.

In the accompanying drawing:

Figure 1 is a side elevation with the right hand end in medial section;

Figure 2 is an end elevation, in section on 2—2 of Figure 1;

Figure 3 is a detail, in section on 3—3 of Figure 2;

Figure 4 is a detail, in section on 4—4 of Figure 1, and

Figure 5 is a modified form with one side set higher than the other side.

Referring to the drawing, and describing the apparatus as being used for chickens, the elongated feed receptacle or trough 10 has low fixed side walls 12, and somewhat higher end walls 14, also fixed, all combining with a bottom 16 to provide a trough in which feed may be deposited, to be picked out by chickens, reaching over a side wall. The trough may be wholly of sheet metal construction, preferably galvanized iron, and may be of any suitable length, for example, four feet, determinable by convenience and by the size of brood to be accommodated.

Set above the trough, as an obstruction over its top opening or mouth, is a rotatable barrier device 18, in the nature of a drum, which is mounted on extension pieces 20 for the end walls 14. The extensions 20 are removably supported on the fixed portions 14 of the end walls. Each is provided with a tongue 22 which fits within a socket 24 on the end wall 14, to maintain the extension part 20 firm on and above the lower fixed part 14. To attain even greater rigidity, the extensions 20 preferably have their lower edges fitting inside the upper edges of the lower fixed wall sections, as at 21, thus to be braced and steadied along the line of juncture as well as by the tongues 22 engaging in socket 24.

The trough is constructed with each of its fixed side walls 12 low enough for a chick to be able to reach over to pick feed from the trough; and the barrier 18 is of such size and position as to prevent bodily entry of the chick into the trough, but so as to leave ample space at each side of the open top through which its head and neck may be inserted.

According to the invention, however, the improved trough embodies features of adjustability for accommodating larger chickens and hens such that, when the chicks have outgrown the fixed side walls 14, a simple mechanical adjustment can elevate these walls to a suitable higher level; and later, to a still higher level, and so on up until the maximum desired height for full grown hens is reached. Each side wall of the trough is provided with an extension 26, arranged inside the fixed wall 14 and vertically adjustable with respect thereto. A vertical slot 28 at each end of the extension has a bolt 30 passing through it and through the fixed wall 14; and a nut 32 on each bolt 30, preferably a wing nut for convenient manipulation can be tightened on the outer end of each bolt to clamp the extension piece 26 and the fixed side wall 14 together at each end of the trough. Thus, after loosening the two wing nuts on a side, the extension 26 may be raised to a desired height and there be made secure by tightening the wing nuts. In the drawing, to attain greater rigidity of wall when extended, a guide strip 34 is shown extending out from each end wall, just in rear of the extension piece. This, with the fixed wall 14, forms a groove in which the end of the extension is slidably confined.

As an incident of the side wall adjustments, the drum-barrier 18 may require adjustment to maintain the side spaces not too large, and yet not too narrow. Each vertical extension 20 of an end-wall is provided with a vertical series of perforations 36 in any of which the trunnions 19 of the barrier 18 may be inserted for a bearing. For lightness, and economy of manufacture, the drum barrier 18 may be of strip metal construction, with the strips 40 spaced apart on rectangular end pieces 42 which carry the trunnions 19, with periodic spacing pieces along and within the barrier. In operation this construction automatically throws off any chicken that alights on the barrier, because the strip 40 on which the chicken alights is almost certain to be, as illustrated in Figures 2 and 5, not exactly in the vertical plane of the trunnions 19, and the weight of the bird, plus the eccentricity of its application, constitutes a moment for turning the barrier, so that the perch, on which the bird has alighted, sinks and tips the bird off. This results from the spacing of the strips apart, the chances being almost infinitely against the barrier coming to rest with the center line of a strip exactly vertically over the axis,—and even if it be so, the momentum of the arriving bird is more than likely to move the barrier off of such a dead center, and the bird cannot then save itself by a slight adjustment of position because of the adjacent space before the next strip is reached. To adjust the barrier 18, the end wall extensions 20 are lifted from their sockets and the barrier trunnions inserted in higher or lower holes in the brackets 38, after which the end extensions may be replaced in their sockets.

In use the trough may be adjusted to suit the particular needs of a breeder, as they change from time to time. For chicks both the side walls and the barrier may be in their lowermost positions. If the brood has become pullets, or the pullets have matured into hens, the side walls and the barrier may be set higher accordingly.

In Figure 5 of the drawing there is illustrated a feature which may be advantageous for the small breeder. One side of the trough may be set as for chicks and the other side be set as for pullets or hens. And the trough may be filled to capacity, with the feed sloping from the high to the low wall. For such a case the axle of the rotary barrier will be provided with bearings 44 a little off of the medial plane, on each side, and will be set in one toward the lower wall. Thus it can be set so as to provide a space beside the top of the higher wall, sufficient for insertion of the head and neck of a hen, or of pullets, while at the same time there is a space above the lower wall, between it and the barrier, through which chicks or other birds of small size can reach in. In this manner a single trough may serve, at the same time, for birds of very different size, on opposite sides of the trough, while measurably attaining the advantages incident to the elevating of a side wall.

While a trough of fixed low walls, low enough for chicks, can possibly be used by pullets and hens, the ability to raise the walls makes possible considerable savings in time and labor due to needed frequency of re-filling with feed, for as a brood reaches the pullet stage, its demand for food increases enormously. Chickens at four weeks eat five times as much as chicks of one week, and chickens of eight weeks ten times as much, so that a trough with fixed walls low enough to accommodate chicks would require several replenishings a day if used for a flock of pullets or hens. According to the invention, however, as a brood progresses through the various stages of growth, the capacity of the trough may be increased in substantal correspondence with the increased daily food demand of the brood.

I claim as my invention:

A feed trough having side walls extensible vertically; a freely rotatable bird barrier, supported in a position extending along and over the trough with free space under the barrier; and means for holding said rotatable barrier at various elevations above the bottom of the trough and at increasing elevations above the tops of the side walls, as the latter are raised.

Signed at Boston, Mass., this 1st day of December, 1928.

FRANKLIN W. PERRY.